Oct. 18, 1927.
J. A. OLDSON
1,645,717
BALANCED CRANKSHAFT
Filed May 16, 1927
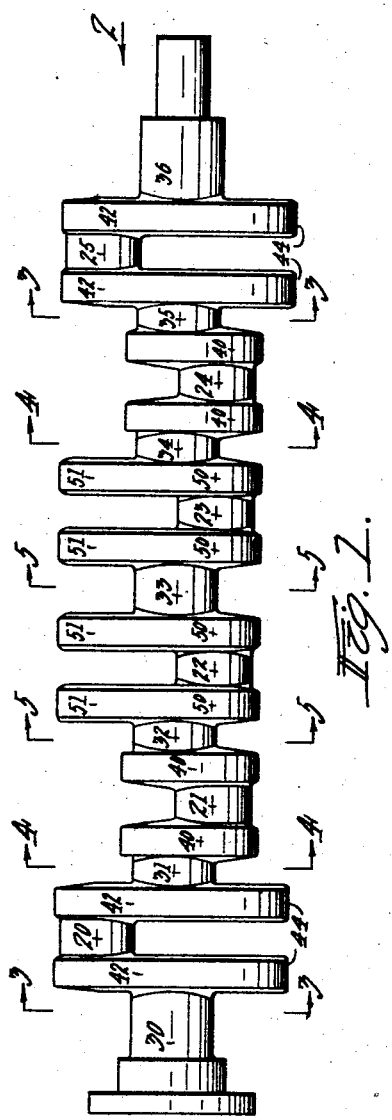
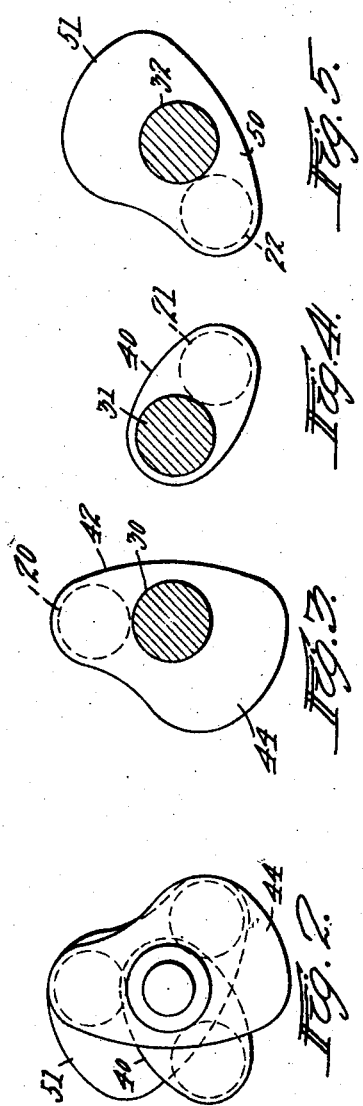
Inventor
John A. Oldson
By Attorneys
Southgate Hay & Hawley Patented Oct. 18, 1927.

1,645,717

UNITED STATES PATENT OFFICE.

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS.

BALANCED CRANK SHAFT.

Application filed May 16, 1927. Serial No. 191,616.

This invention relates to a balanced crankshaft for automobile engines having six cranks, and having seven shaft bearings, one at each side of each crank.

It is the general object of my invention to improve the construction of such crankshafts by providing a pair of counterweights for each end and center crank only, said counterweights being forged integral with the crankshaft and being disposed at both sides of each end or center crank.

A further object of my invention is to so design and position said counterweights that they will effectively counterbalance the intermediate cranks which are not directly provided with counterweights.

My invention further relates to arrangements and combinations of parts which will be hereinafter described and more particularly pointed out in the appended claim.

A preferred form of the invention is shown in the drawings in which

Fig. 1 is a front elevation of my improved crankshaft;

Fig. 2 is an end elevation, looking in the direction of the arrow 2 in Fig. 1; and Figs. 3, 4 and 5 are sectional elevations, taken along the lines 3—3, 4—4 and 5—5 respectively in Fig. 1.

Referring to the drawings, I have shown a six-throw seven-bearing crankshaft having six crank-pins numbered 20 to 25 respectively, and having seven shaft bearings numbered 30 to 36 inclusive. Each crank-pin is directly connected to its two adjacent shaft bearings by a cheek at each end of each crank-pin. The crank-pin 21 for instance is connected to the shaft bearings 31 and 32 by simple straight cheeks 40, as shown in Fig. 4, and the crank-pin 24 is similarly connected to the shaft bearings 34 and 35.

The end crank-pins 20 and 25 are connected to their adjacent shaft bearings by cheeks 42. Each cheek 42 (Fig. 3) is prolonged beyond the axis of the shaft and is enlarged laterally to provide a counterweight 44 of substantial mass. The center of mass of the counterweight is angularly displaced from the center line of the associated crank by an angle of substantially 30° and is displaced in a direction away from the adjacent unbalanced crankpin 21 or 24.

As viewed in Fig. 1, each counterweight 44 is displaced rearwardly, while the crankpins 21 and 24 project forwardly from the vertical plane.

The center crank-pins 22 and 23 are similarly provided with cheeks 50 at each side of each crank-pin, which are similarly projected beyond the axis of the shaft and which are provided with counterweights 51, as indicated in Fig. 5. The center of mass of each counterweight 51 is likewise displaced from the center line of the associated crank by an angle of substantially 30°. As viewed in Fig. 1, the displacement of the counterweight is upward, whereas the adjacent unbalanced crank-pins 21 and 24 are displaced downwardly with respect to the shaft axis.

Considering either half of the crankshaft, I thus have two counterweights 44 and two counterweights 51 diametrically opposed to each other, thus preserving static balance, and these counterweights are each displaced at an angle of substantially 30° and in a direction opposite to that of the intermediate unbalanced crank-pin. The masses of the counterweights are such that they not only counterbalance the associated crank-pins 20, 22, 23 and 25, and portions of the connecting rods and pistons associated therewith, but they also, by their angular displacement, counterbalance the intermediate crank-pins 21 and 24 and their cheeks 40 and certain portions of the connecting rods and pistons associated therewith.

The counterweights 44 and 51, positioned as above described, also substantially offset the dynamic couple produced by the successive applications of power to the different crank-pins, and permit the crankshaft to be operated at high speed without significant vibration.

The counterweights are formed integral with the crankshaft by special forging operations, so that in forging there is a continuous flow of metal from the crankshaft to the counterweights, and loosening or displacement of the counterweights is rendered impossible. This is of very great advantage in high speed engines in which a loose counterweight may do very serious damage in a very short time.

Having thus described my invention and the advantages thereof, I do not wish to be limited to the details herein disclosed other- wise than as set forth in the claim, but what I do claim is:—

A six-throw seven-bearing balanced crankshaft having each crankpin directly connected by cheeks to its shaft bearings at each side of each crank-pin, and having both cheeks of each end crank and of each center crank projecting beyond the shaft axis and enlarged laterally to provide a counterweight of substantial mass, said counterweights being forged integral with the crankshaft and the center of mass of each counterweight being displaced angularly substantially 30° from the center line of each associated crank and in a direction away from the adjacent unbalanced intermediate crank, the end and center counterweights being diametrically opposite and said shaft being thereby balanced both statically and dynamically.

In testimony whereof I have hereunto affixed my signature.

JOHN A. OLDSON.